United States Patent
Segù et al.

(10) Patent No.: US 12,462,144 B2
(45) Date of Patent: Nov. 4, 2025

(54) DOMAIN GENERALIZATION VIA BATCH NORMALIZATION STATISTICS

(71) Applicant: Google LLC, Mountain View, CA (US)

(72) Inventors: Mattia Segù, Zurich (CH); Federico Tombari, Zug (CH); Alessio Tonioni, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 637 days.

(21) Appl. No.: 17/909,545

(22) PCT Filed: Mar. 5, 2021

(86) PCT No.: PCT/US2021/021002
§ 371 (c)(1),
(2) Date: Sep. 6, 2022

(87) PCT Pub. No.: WO2021/178747
PCT Pub. Date: Sep. 10, 2021

(65) Prior Publication Data
US 2023/0122207 A1   Apr. 20, 2023

Related U.S. Application Data (60) Provisional application No. 62/985,434, filed on Mar. 5, 2020.

(51) Int. Cl.
*G06F 16/00*   (2019.01)
*G06N 3/045*   (2023.01)
(Continued)

(52) U.S. Cl.
CPC ........... *G06N 3/045* (2023.01); *G06N 3/0464* (2023.01); *G06N 3/048* (2023.01); *G06N 3/08* (2013.01)

(58) Field of Classification Search
None
See application file for complete search history.

(56) References Cited

U.S. PATENT DOCUMENTS 11,537,787 B2 * 12/2022 Shekhar ............... G06F 18/211
2010/0045692 A1 * 2/2010 Nemirovsky ......... G06T 3/4061
345/582
(Continued)

FOREIGN PATENT DOCUMENTS

CN           110555060 A    12/2019

OTHER PUBLICATIONS

Carlucci et al., "AutoDIAL: Automatic Domain Alignment Layers", 2017 IEEE International Conference on Computer Vision, Nov. 27, 2017, pp. 5077-5085.
(Continued)

*Primary Examiner* — Hasanul Mobin
(74) *Attorney, Agent, or Firm* — DORITY & MANNING P.A.

(57) ABSTRACT

Generally, the present disclosure is directed to systems and methods that leverage batch normalization statistics as a way to generalize across domains in particular, example implementations of the present disclosure can generate different representations for different domains by collecting independent batch normalization statistics, which can then be used to map between domains in a shared latent space. At test or inference time, samples from an unknown test or target domain can be projected into the same shared latent space. The domain of the target sample can therefore be expressed as a linear combination of the known ones, with the combination between weighted based on respective distances between batch normalization statistics in the latent space. This same mapping strategy can be applied at both training and test time to learn both a latent representation and a (Continued)

powerful but light-weight ensemble model that operates within such latent space.

14 Claims, 7 Drawing Sheets

(51) Int. Cl.
  *G06N 3/0464* (2023.01)
  *G06N 3/048* (2023.01)
  *G06N 3/08* (2023.01)

(56) References Cited

U.S. PATENT DOCUMENTS

| | | | |
|---|---|---|---|
| 2017/0116544 A1* | 4/2017 | Johnson | G06N 20/10 |
| 2019/0005069 A1* | 1/2019 | Filgueiras de Araujo | G06V 10/757 |
| 2019/0146497 A1* | 5/2019 | Urtasun | G06V 20/58 701/27 |
| 2020/0059451 A1* | 2/2020 | Huang | G06N 3/044 |
| 2020/0075127 A1* | 3/2020 | Aliper | G16B 40/20 |
| 2021/0042515 A1* | 2/2021 | Anderson | G06F 40/30 |
| 2021/0064372 A1* | 3/2021 | Sun | G06F 7/483 |
| 2021/0110272 A1* | 4/2021 | Guo | G06N 3/048 |

OTHER PUBLICATIONS

International Search Report for Application No. PCT/US2021/021002, mailed Aug. 10, 2021, 2 pages.
Segú et al., "Batch Normalization Embeddings for Deep Domain Generalization", arxiv.org, XP081822235.
Seonguk et al., "Learning to Optimize Domain Specific Normalization with Domain Augmentation for Domain Generalization", arxiv.org, XP081494637.
Zhang et al., "A Deep Transfer Model with Wasserstein Distance Guided Multi-Adversarial Networks for Bearing Fault Diagnosis Under Different Working Conditions", IEEE Access, vol. 7, May 31, 2019, pp. 65303-65318.
International Preliminary Report on Patentability for Application No. PCT/US2021/021002, mailed Sep. 15, 2022, 14 pages.
Abadi et al., "Tensorflow: Large-Scale Machine Learning on Heterogeneous Distributed Systems", arXiv:1603.04467v2, Mar. 16, 2016, 19 pages.
Balaji et al., "MetaReg: Towards Domain Generalization Using Meta-Regularization", 32nd Conference on Neural Information Processing Systems, Montreal, Canada, Dec. 3-8, 2018, 11 pages.
Bjorck et al., "Understanding Batch Normalization", $32^{nd}$ Annual Conference on Neural Information Processing Systems, Montreal, Canada, Dec. 3-8, 2018, 12 pages.
Bousmalis et al., "Domain Separation Networks", arXiv:1608.06019v1, Aug. 22, 2016, 15 pages.
Bridle, "Probabilistic Interpretation of Feedforward Classification Network Outputs, with Relationships to Statistical Pattern Recognition", Neurocomputing, 1990, pp. 227-236.
Carlucci et al., "Domain Generalization by Solving Jigsaw Puzzles", arXiv:1903.06864v2, Apr. 14, 2019, 11 pages.
Carlucci et al., "Just Dial: Domain Alignment Layers for Unsupervised Domain Adaptation", arXiv:1702.06332v3, Apr. 27, 2017, 11 pages.
D'Innocente et al., "Domain Generalization with Domain-Specific Aggregation Modules", arXiv:1809.10966v1, Sep. 28, 2018, 12 pages.
Deng et al., "ImageNet: A Large-Scale Hierarchical Image Database", 2009 Institute of Electrical and Electronics Engineers Conference on Computer Vision and Pattern Recognition, Miami, Florida, United States, Jun. 20-25, 2009, 8 pages.
Ding et al., "Deep Domain Generalization with Structured Low-Rank Constraint" Institute of Electrical and Electronics Engineers Transactions on Image Processing, Jan. 2018, vol. 27, No. 1, pp. 304-313.
Dou et al., "Domain Generalization via Model-Agnostic Learning of Semantic Features", arXiv:1910.13580v1, Oct. 29, 2019, 12 pages.
Finn et al., "Model-Agnostic Meta-Learning for Fast Adaptation of Deep Networks", arXiv:1703.03400v3, Jul. 18, 2017, 13 pages.
Ghifary et al., "Domain Generalization for Object Recognition with Multi-Task Autoencoders", arXiv:1508.07680v1, Aug. 31, 2015, 9 pages.
Gong et al., "Geodesic Flow Kernel for Unsupervised Domain Adaptation", 2012 Institute of Electrical and Electronics Engineers Conference on Computer Vision and Pattern Recognition, Providence Rhode Island, United States, Jun. 16-21, 2012, pp. 2066-2073.
Griffin et al., "Caltech-256 Object Category Dataset", 2007, CalTech Report, 20 pages.
He et al., "Deep Residual Learning for Image Recognition", arXiv:1512.03385v1, Dec. 10, 2015, 12 pages.
Hu et al., "Domain Generalization via Multidomain Discriminant Analysis", arXiv:1907.11216v1, Jul. 25, 2019, 21 pages.
Huang et al., "Self-Challenging Improves Cross-Domain Generalization", arXiv:2007.02454v1, Jul. 5, 2020, 20 pages.
Ioffe et al., "Batch Normalization: Accelerating Deep Network Training by Reducing Internal Covariate Shift", arXiv:1502.03167v3, Mar. 2, 2015, 11 pages.
Khosla et al., "Undoing the Damage of Dataset Bias", European Conference on Computer Vision, Florence, Italy, Oct. 7-13, 2012, 15 pages.
Kingma et al., "Adam: A Method for Stochastic Optimization", arXiv:1412.6980v9, Jan. 30, 2017, 15 pages.
Koch et al., "Siamese Neural Networks for One-Shot Image Recognition", $32^{nd}$ International Conference on Machine Learning, Lille, France, Jul. 6-11, 2015, 8 pages.
Krizhevsky et al., "ImageNet Classification with Deep Convolutional Neural Networks", In Advances in Neural Information Processing Systems, 2012, pp. 1097-1105.
Li et al., "Adaptive Batch Normalization for Practical Domain Adaptation", Pattern Recognition, 2018, vol. 80, pp. 109-117, 2018, 9 pages.
Li et al., "Deep Domain Generalization via Conditional Invariant Adversarial Networks", European Conference on Computer Vision (ECCV), Munich, Germany Sep. 8-14, 2018, pp. 624-639.
Li et al., "Deeper, Broader and Artier Domain Generalization", arXiv:1710.03077v1, Oct. 9, 2017, 9 pages.
Li et al., "Domain Generalization via Conditional Invariant Representations", arXiv:1807.08479v1, Jul. 23, 2018, 9 pages.
Li et al., "Domain Generalization with Adversarial Feature Learning", Institute of Electrical and Electronics Engineers Conference on Computer Vision and Pattern Recognition, Salt Lake City, Utah, United States, Jun. 18-22, 2018, pp. 5400-5409, 10 pages.
Li et al., "Episodic Training for Domain Generalization", arXiv:1902.00113v3, Dec. 6, 2019, 11 pages.
Li et al., "Learning to Generalize: Meta-Learning for Domain Generalization", arXiv:1710.03463v1, Oct. 10, 2017, 8 pages.
Li et al., "Revisiting Batch Normalization for Practical Domain Adaptation", arXiv:1603.04779v4, Nov. 8, 2016, 12 pages.
Loquercio et al., "Deep Drone Racing: From Simulation to Reality with Domain Randomization", arXiv:1905.09727v2, Nov. 25, 2019, 16 pages.
Luo et al., "Taking A Closer Look at Domain Shift: Category-level Adversaries for Semantics Consistent Domain Adaptation", arXiv:1809.09478v3, Apr. 1, 2019, 10 pages.
Van der Maaten et al., "Visualizing Data using t-SNE", Journal of Machine Learning Research, 2008, vol. 9, pp. 2579-2605.
Mancini et al., "AdaGraph: Unifying Predictive and Continuous Domain Adaptation Through Graphs", arXiv:1903.07062v3, Jun. 12, 2019, 11 pages.
Mancini et al., "Best Sources Forward: Domain Generalization Through Source-Specific Nets", 25th Institute of Electrical and Electronics Engineers International Conference on Image Processing (ICIP), Athens, Greece, Oct. 7-10, 2018, pp. 1353-1357.
Mancini et al., "Boosting Domain Adaptation by Discovering Latent Domains", arXiv:1805.01386v1, May 3, 2018, 10 pages.

(56) References Cited

OTHER PUBLICATIONS

Mancini et al., "Robust Place Categorization with Deep Domain Generalization", arXiv:1805.12048v1, May 30, 2018, 9 pages.
Matsuura et al., "Domain Generalization Using a Mixture of Multiple Latent Domains", arXiv:1911.07661v1, Nov. 18, 2019, 9 pages.
Motiian et al., "Unified Deep Supervised Domain Adaptation and Generalization", arXiv:1709.10190v1, Sep. 28, 2017, 11 pages.
Muandet et al., "Domain Generalization via Invariant Feature Representation", arXiv:1301.2115v1, Jan. 10, 2013, 20 pages.
Rahman et al., "Multi-component Image Translation for Deep Domain Generalization", arXiv:1812.08974v1, Dec. 21, 2018, 10 pages.
Saenko et al., "Adapting Visual Category Models to New Domains", European Conference on Computer Vision, 2010, pp. 213-227.
Seo et al., "Learning to Optimize Domain Specific Normalization for Domain Generalization", arXiv:1907.04275v3, Jul. 21, 2020, 16 pages.
Shankar et al., "Generalizing Across Domains via Cross-Gradient Training", arXiv:1804.10745v2, May 1, 2018, 12 pages.
Simon et al., "ImageNet Pre-Trained Models with Batch Normalization", arXiv:1612.01452v2, Dec. 6, 2016, 4 pages.
Storkey et al., "Mixture Regression for Covariate Shift", Advances in Neural Information Processing Systems, 2007, pp. 1337-1344.
Tobin et al., "Domain Randomization for Transferring Deep Neural Networks from Simulation to the Real World", arXiv:1703.06907v1, Mar. 20, 2017, 8 pages.
Volpi et al., "Generalizing to Unseen Domains via Adversarial Data Augmentation", arXiv:1805.12018v2, Nov. 6, 2018, 17 pages.
Wang et al., "Deep Visual Domain Adaptation: A Survey", arXiv:1802.03601v4, May 25, 2018, 20 pages.
Wu et al., "Group Normalization", arXiv:1803.08494v3, Jun. 11, 2018, 10 pages.
Yosinski et al., "How Transferable are Features in Deep Neural Networks?", arXiv:1411.1792v1, Nov. 6, 2014, 14 pages.
Chinese Search Report Corresponding to Application No. 2021800168161 on Jul. 15, 2025.

* cited by examiner

| ALGORITHN 1: TRAINING PROCEDURE |
| --- |
| INITIALIZATION; |
| WHILE NOT CONVERGED DO |
|     FOR BATCH IN DATASET DO |
|         FOR DOMAIN BATCH IN BATCH DO |
|             UPDATE DOMAIN POPULATION STATISTICS; |
|         END |
|         FOR DOMAIN BATCH IN BATCH DO |
|             FOR SAMPLE IN DOMAIN BATCH DO |
|                 PROPAGATE SAMPLE TO COLLECT INSTANCE STATISTICS; |
|                 COMPUTE DISTANCES FROM DOMAIN EMBEDDINGS; |
|                 COMPUTE FINAL PREDICTION AS IN Eq. 12 |
|             END |
|         END |
|         COMPUTE LOSS; |
|         COMPUTE GRADIENTS; |
|         BACK-PROPAGRATE GRADIENTS; |
|     END |
| END |

DOMAIN GENERALIZATION VIA BATCH NORMALIZATION STATISTICS

PRIORITY CLAIM

This application is based upon and claims the right of priority under 35 U.S.C. § 371 to International Application No. PCT/US2021/021002 filed on Mar. 5, 2021, which claims priority to and the benefit of U.S. Provisional Patent Application No. 62/985,434, filed Mar. 5, 2020. Applicant claims priority to and the benefit of each of such applications and incorporates all such applications herein by reference in its entirety.

FIELD

The present disclosure relates generally to domain generalization in machine-learned models. More particularly, the present disclosure relates to domain generalization by exploring the latent space of batch normalization ("batchnorm") statistics.

BACKGROUND

Machine learning models trained on a distribution of data often fail to generalize to samples from different distributions. This phenomenon is commonly referred to in literature as domain shift between training and testing data and is one of the biggest limitations of data driven algorithms. Assuming the availability of few annotated samples from the test domain, the problem can be mitigated by fine-tuning the model with explicit supervision or with domain adaptation techniques. Unfortunately, this assumption does not always hold in practice as it is often unfeasible to collect samples for any possible environment for real applications (e.g., all possible test domains). For example, solutions for autonomous driving will require samples from any possible road in any possible season and weather condition.

In contrast to domain adaptation, domain generalization refers to algorithms to solve the domain shift problem by training or configuring models so that they are robust to unseen domains. Thus, in domain generalization techniques, explicit samples of the test or target domains are not required (or may not be available) at training time.

Most domain generalization works leverage many training sets to learn a domain-invariant feature extractor. Others focus on explicitly optimizing the model parameters to have consistent performance across domains with ad-hoc training policies, while a different line of work requires modifications to the model architecture to achieve domain invariance. However, none of these solutions makes the best use of the domain-specific training data since they explicitly attempt to discard any domain-specific information.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to perform domain generalization via batch normalization statistics. The method includes obtaining, by a computing system comprising one or more computing devices, a machine-learned ensemble model that comprises a shared parameter portion and a plurality of different batch normalization layers respectively associated with a plurality of different source domains, wherein a plurality of different sets of batch normalization statistics are respectively associated with the plurality of different source domains. The method includes accessing, a target sample associated with a target domain. The method includes determining, by the computing system, a target set of batch normalization statistics for the target sample. The method includes determining, by the computing system, a plurality of similarity scores respectively between the target set of batch normalization statistics and the plurality of different sets of batch normalization statistics respectively associated with the plurality of different source domains. The similarity scores can be measures of distance or other statistical measures of similarity. The method includes respectively processing, by the computing system, the target sample with the machine-learned ensemble model to respectively generate a plurality of domain-specific predictions respectively associated with the plurality of different source domains. The method includes interpolating, by the computing system, the plurality of domain-specific predictions based at least in part on the respective similarity scores between the target set of batch normalization statistics and the plurality of different sets of batch normalization statistics to obtain a target prediction for the target sample in the target domain. The method includes outputting, by the computing system, the target prediction for the target sample.

Another example aspect of the present disclosure is directed to a computing system for training an ensemble model to perform domain generalization. The computing system includes one or more processors and one or more non-transitory computer-readable media that collectively store: an ensemble model that comprises one or more multi-source domain alignment layers, wherein each multi-source domain alignment layer comprises a shared weight portion and a plurality of different batch normalization layers respectively associated with a plurality of source domains; and instructions that, when executed by the one or more processors, cause the computing system to perform operations for each of one or more training iterations. The operations include obtaining a training batch that comprises a plurality of domain-specific sets of training examples respectively associated with the plurality of source domains. The operations include updating a plurality of different sets of batch normalization statistics for the plurality of different batch normalization layers respectively associated with the plurality of source domains. The operations include, for each training example in the plurality of domain-specific sets of training examples: determining a training set of batch normalization statistics for the training example; determining a plurality of similarity scores respectively between the training set of batch normalization statistics and the plurality of different sets of batch normalization statistics respectively associated with the plurality of different source domains; and interpolating a plurality of domain-specific predictions based at least in part on the respective similarity scores between the training set of batch normalization statistics and the plurality of different sets of batch normalization statistics to obtain a training prediction for the training example. The operations include determining an aggregate loss based on the respective training prediction generated for each training example in the plurality of domain-specific sets of training examples. The operations include updating one or more parameter values for at least the shared weight portion of at least one of the one or more multi-source domain alignment layers.

Another example aspect of the present disclosure is directed to one or more non-transitory computer-readable media that store instructions that when executed by one or more processors cause a computing system to perform operations. The operations include obtaining a machine-learned ensemble model that comprises a shared parameter portion and a plurality of parallel batch normalization layers that are respectively associated with a plurality of different source domains. The operations include accessing a target sample associated with a target domain. The operations include respectively processing the target sample with the machine-learned ensemble model to respectively generate a plurality of domain-specific predictions respectively associated with the plurality of different source domains. The operations include determining a plurality of distances respectively between a target set of batch normalization statistics generated for the target sample and a plurality of different sets of batch normalization statistics respectively associated with the plurality of different batch normalization layers respectively associated with the plurality of different source domains. The operations include interpolating the plurality of domain-specific predictions based at least in part on the respective distances between the target set of batch normalization statistics and the plurality of different sets of batch normalization statistics to obtain a target prediction for the target sample in the target domain. The operations include outputting the target prediction for the target sample.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Reference numerals that are repeated across plural figures are intended to identify the same features in various implementations.

DETAILED DESCRIPTION

Overview

Generally, the present disclosure is directed to systems and methods that leverage batch normalization statistics as a way to generalize across domains. In particular, example implementations of the present disclosure can generate different representations for different domains by collecting independent batch normalization statistics, which can then be used to map between domains in a shared latent space. At test or inference time, samples from an unknown test or target domain can be projected into the same shared latent space. The domain of the target sample can therefore be expressed as a linear combination of the known ones, with the combination weighted based on respective similarity scores between batch normalization statistics in the latent space. This same mapping strategy can be applied at both training and test time to learn both a latent representation and a powerful but lightweight ensemble model that operates within such latent space. Example experiments on example implementations of the proposed systems and methods are contained in the Appendix and demonstrate a significant increase (up to +12%) in classification accuracy over current state-of-the-art techniques on the following popular domain generalization benchmarks: PACS, Office31 and Office-Caltech.

Thus, in one example, a machine-learned ensemble model can include a shared parameter portion and a plurality of different batch normalization layers respectively associated with a plurality of different source domains. During training, a plurality of different sets of batch normalization statistics can be generated for the plurality of different source domains. During inference, a computing system can determine a target set of batch normalization statistics for a target sample associated with a target domain. Thereafter, the computing system can determine a plurality of similarity scores respectively between the target set of batch normalization statistics and the plurality of different sets of batch normalization statistics respectively associated with the plurality of different source domains. The computing system can process the target sample with the machine-learned ensemble model to respectively generate a plurality of domain-specific predictions respectively associated with the plurality of different source domains. The computing system can interpolate the plurality of domain-specific predictions based at least in part on the respective similarity scores between the target set of batch normalization statistics and the plurality of different sets of batch normalization statistics to obtain a target prediction for the target sample in the target domain.

More particularly, example aspects of the present disclosure explicitly foster domain-specific representations by collecting independent batch normalization statistics for each of the available domains at training time. In some implementations, this results in training a lightweight ensemble of domain specific models with most or all of the parameters shared except for normalization statistics. Upon the reaching of convergence, the accumulated statistics can be used to map each domain as a point in a latent space.

Figure 1A:
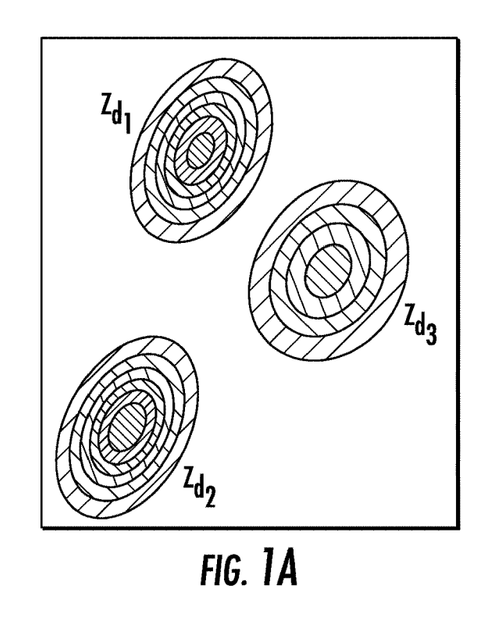
FIGS. 1A-C depict graphical diagrams of a process of creating domain-specific representations, projecting a sample from an unknown domain, and localizing the sample with respect to the known domains according to example embodiments of the present disclosure.

To provide an example, FIG. 1A shows a visualization of such a space for a simplified case of a single batch normalization layer operating on the output of a convolutional layer with two filters (e.g., just two means and variances are accumulated, and each domain can be represented as a 2D gaussian; other embodiments accumulate larger numbers of statistics e.g., across multiple sequential layers). In this space the membership of a sample to a domain can be effectively measured by simply looking at the distance between the instance normalization statistics of the sample and each of the domain-specific statistics (e.g., with specific distance to their centroids which correspond to the accumulated population statistics). Thus, normalization statistics can be used to effectively learn a latent space of domains.

Figure 1B:
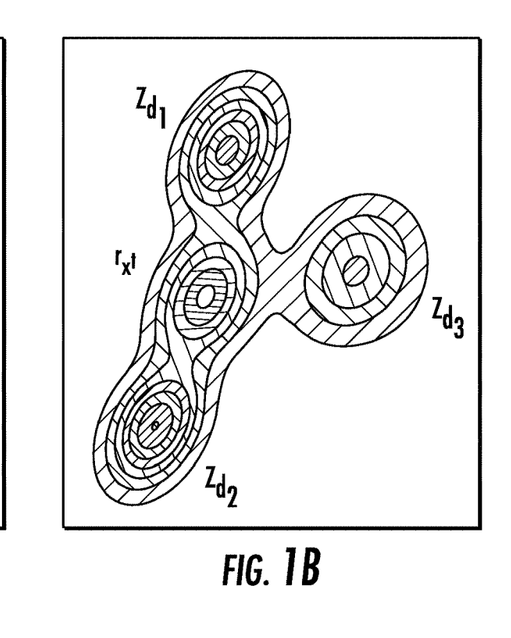
Figure 1C:
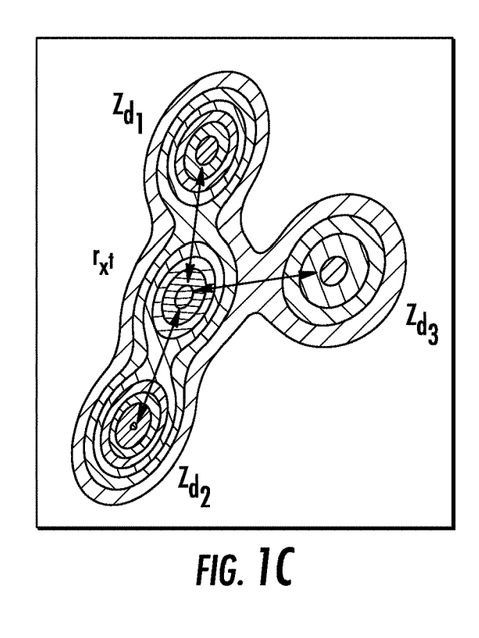

In particular, the same latent space representation can be used on samples from unknown domains, relying on their instance statistics to project them into the same latent space. FIG. 1B illustrates a visualization of this projection for a sample from an unknown domain via its instance statistics. After the projection, a distance of the sample from the domain centroids can be determined, effectively trying to localize the unknown domain with respect to the known ones. This process is sketched in FIG. 1C, where the arrows denote the measured distance between known domain centroids and the unknown domain.

After the projection, the prediction of the proposed lightweight ensemble for the test sample can be generated as the combination of the domain-specific predictions. For example, the domain-specific predictions can be weighted according to the reciprocal of the distances in the latent space from the known domains. The same combination of domain-specific models can be used at training time on samples from the known domains. By doing so, the proposed training approaches force the models to learn a meaningful latent space and logits that can be safely linearly combined according to the proposed weighting strategy.

Thus, example aspects of the present disclosure recognize that batch normalization statistics (e.g., accumulated on convolutional layers) can be used to map input samples (e.g., inputs images) to a latent space where membership to a domain can be measured according to the distance of the sample from domain centroids. One effective use of this concept is to learn a lightweight ensemble model that shares some or all parameters except for the normalization statistics. Such an ensemble model can generalize better to unseen domains via interpolation of the various domain-specific predictions based on distance between instance norm statistics for the target sample to the domain centroids.

The present disclosure provides a number of technical effects and benefits. As one example, compared to previous work, the proposed systems and methods do not discard domain specific attributes but use them to learn a domain latent space and map unknown domains with respect to known ones. This results in a drastic improvement over state-of-the-art with different network architectures on standard domain generalization benchmarks. Thus, the ability of a computing system to generalize to unseen domains can be improved.

The proposed techniques can be applied to many different machine learning model architectures which feature batch normalization statistics, including, as examples, any modern Convolutional Neural Network (CNN) that relies on batch normalization layers. The proposed approach also scales gracefully to the number of domains available at training time.

As another example technical effect and benefit, the domain generalization techniques described herein can eliminate the need to train or re-train a new model for each possible domain or to collect training samples from all possible domains. In particular, the proposed systems and methods can generate a single ensemble model that is robust to new or unseen domains. Therefore, it is not necessary to generate additional models or collect additional training data for such additional domains. In such fashion, computing resources which would be spent on model training or training data collection can be conserved, thereby reducing the consumption of computing resources such as processor usage, memory usage, and/or network bandwidth.

Example Domain Generalization Techniques

One example aspect of the proposed techniques is to use batch normalization statistics to map known and unknown domains in a shared latent space where domain membership of samples can be measured according to distance between gaussian distributions. The following sections introduce some common notations, describe an example multi-source domain alignment layers that can be used to map domains in a latent space, and describe examples of how to project samples from unknown domains in the same latent space to obtain robust performances. Finally, the same prediction by mapping strategy can be incorporated at training time to improve the model performance.

Example Notation

Let X and Y denote the input (e.g., images) and the output (e.g., object categories) space of a model. Let $D=\{d_i\}_{u=1}^{K}$ denote the set of the K source domains available at training time. Each domain $d_i$ can be described by an unknown probability distribution $p_{d_i}^{xy}=p(y|x,i)$ over the space X×Y. The aim of a machine learning model is to learn the probability distribution $p^{xy}$ of the whole training set. Let t be a generic target domain available only at testing time and following the unknown probability distribution $p_t^{xy}$ over the same space.

Commonly, deep learning models learn a mapping X→Y. Example implementations of the present disclosure include a lightweight ensemble of models that learns a mapping (X, D)→Y that leverages the domain label to learn an ensemble of posterior distributions $\{p_i^{xy}\}_{i=1}^{K}$ conditioned on the domain membership. Since it is not possible to learn the target distribution $p_t^{xy}$ during training, one goal of the proposed methods is to approximate it as a mixture (e.g., linear combination) of the learned source distributions $p_i^{xy}$.

A training set $S_d=\{(x_{1_d}, y_{1_d}), \ldots, (x_{n_d}, y_{n_d})\}$ containing $n_d$ labelled samples is given for each source domain d∈D. The test set $T=\{x_{1_t}, \ldots, x_{n_t}\}$ is composed of $m_t$ unlabelled samples collected from the unknown marginal distribution $p_t^x$ of the target domain t. As opposed to the domain adaptation setting, the domain generalization approach used herein assumes that samples from the target domain are not available at training time. Moreover, at inference time it is assumed that each unseen sample is treated independently, that is, information from previously seen target samples is not accumulated to influence new predictions.

Example Multi-Source Domain Alignment Layer

Neural networks are particularly prone at capturing dataset bias in their internal representations. Internal features distributions are indeed highly domain-dependent. To capture and alleviate the distribution shift that is inherent in the multi-source setting, example implementations of the present disclosure adapt batch normalization layers to normalize the domain-dependent activations to a same reference distribution via domain-specific normalization statistics.

The activations of a certain domain d can thus be normalized by matching their first and second order moments, nominally ($\mu_d$, $\sigma_d^2$), to those of a reference gaussian with zero mean and unitary variance:

$$BN(x_d; \mu_d, \sigma_d^2 | d) = \frac{x_d - \mu_d}{\sqrt{\sigma_d^2 + \varepsilon}}, \quad (1)$$

where $x_d$ is an input activation extracted from the marginal distribution $q_d^x$ of the activations from the domain d;

$$\mu_d = _{x \sim q_d^x}[x] \text{ and } \sigma_d^2 = \text{Var}_{x \sim q_d^x}[x]$$

are the population statistics for the domain d, and $\varepsilon > 0$ is a small constant to avoid numerical issues.

At training time, the multi-source batch normalization layer can collect and apply domain-specific batch statistics ($\mu_d^b$, $\sigma_d^{b^2}$), while accordingly updating the domain population statistics as moving average of the statistics for every batch b.

At inference time, each test sample can be analyzed individually and the domain label d may not be available. This boils down to the case where the batch size is equal to 1. It is possible to compare the instance statistics of a single sample x with the statistics ($\mu_d^b$, $\sigma_d^{b^2}$) of a batch b from the domain d. Since the population statistics are nothing but a less noisy estimate of the statistics of the same gaussian distribution, the validity of this statement extends to the comparison with them.

For example, an analysis of the computation of the batch statistics in the case of a 2D feature map of size H×W and batch size B is as follows:

$$\mu^b = \frac{1}{B \cdot H \cdot W} \sum_{b,h,w} x_{b,h,w} \stackrel{(B=1)}{=} \frac{1}{H \cdot W} \sum_{h,w} x_{h,w} \quad (2)$$

$$\sigma^{b^2} = \frac{1}{B \cdot H \cdot W} \sum_{b,h,w} (x_{h,w} - \mu^b)^2 \stackrel{(B=1)}{=} \frac{1}{H \cdot W} \sum_{h,w} (x_{b,h,w} - \mu^b)^2, \quad (3)$$

where $\mu^b$ and $\sigma^{b^2}$ are respectively the batch mean and variance and x is the value of a single element of the feature map. If one considers the normally distributed aleatoric variable $x \sim N(\mu^b, \sigma^{b^2})$, it is evident that the instance statistics (case B=1) are an estimate of the parameters of the same gaussian, but computed over a lower number of samples H·W instead of B·H·W Since internal features distributions are highly domain-dependent, the population statistics accumulated for each domain provide a compact representation of the corresponding domain. The next section explains how this layer can be exploited to map source domains and unseen samples in the same latent space.

Figure 2A:
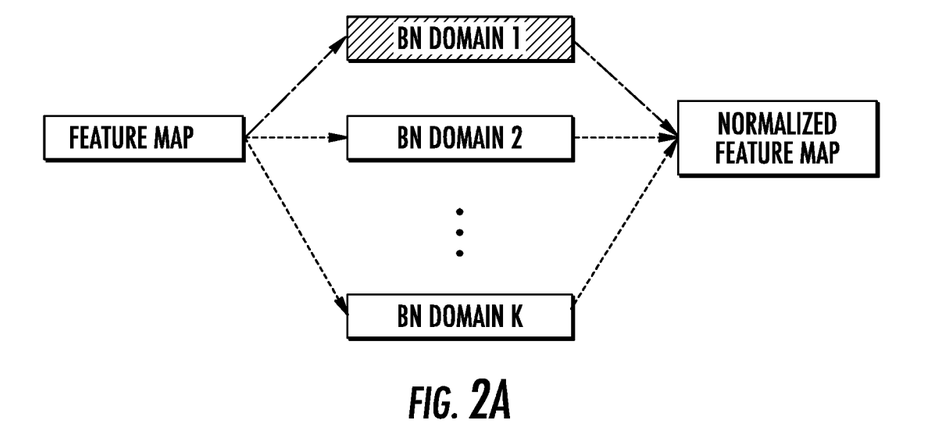
FIGS. 2A and 2B depict example multi-source domain alignment layers according to example embodiments of the present disclosure.
Figure 2B:
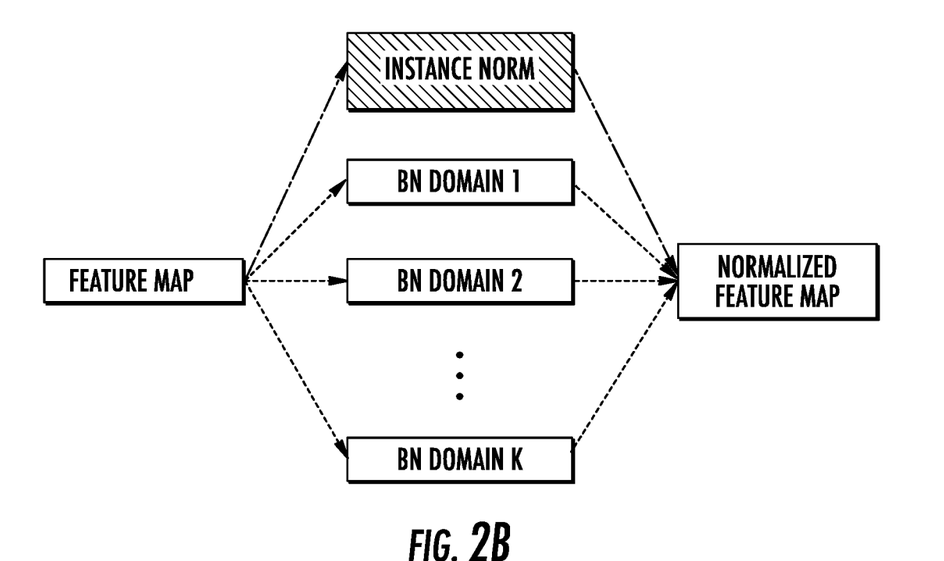

FIGS. 2A and 2B illustrate example multi-source domain alignment layers. In particular, as shown at FIG. 2A, the layer can include a shared weight portion to generate a feature map and multiple batch normalization layers in parallel which respectively correspond to different source domains. At training time, the batch normalization layers can collect and update domain-specific batch and population statistics. At inference time, as illustrated in FIG. 2B, to compute the final prediction the same layer can collect the instance statistics of a target sample, which can then be used to estimate its domain membership. In some implementations, while separate batch normalization statistics are kept for each domain, the same batch normalization layer parameters gamma and beta can be jointly learned and shared by all batch normalization layers for all domains.

Example Domain Localization in the Batchnorm Latent Space

Leveraging the Domain Alignment Layer proposed in the previous section to collect specific statistics allows the network to learn the multiple source distributions distinctly.

The result of this expedient is that a lightweight ensemble of models is learned, where every model shares some or all of the weights but differs for the normalization parameters. In one example all of the weights are shared but differs for the normalization parameters at one or more layers. In another example, all of the weights of a shared feature extraction portion are shared but differs for the normalization parameters at one or more layers and differs in that each source domain has a domain-specific prediction head.

Since such lightweight ensemble embodies the multiple source distributions $\{p_d^{xy}\}_{d \in D}$, the present disclosure proposes to reduce the domain shift on the target domain by optimally interpolating across these distributions to approximate the target distribution $p_t^{xy}$. The resulting target distribution is a weighted mixture of the distributions in the ensemble. The choice of the weights depends in some implementations on the distance of a test sample from each source domain within the latent space.

Thus, example implementations map individual domains in a latent space based on their population statistics ($\mu_d$, $\sigma_d^2$), where $\mu_d = [\mu_d^1, \mu_d^2, \ldots, \mu_d^L]$ and $\sigma_d^2 = [\sigma_d^{1^2}, \sigma_d^{2^2}, \ldots, \sigma_d^{L^2}]$ are the vectors of the accumulated population means and variances for the domain d for all layers $l \in B = \{1, 2, \ldots, L\}$. B is the set of batch normalization layers in the selected model architectures. The set of batch normalization layers included in the set B can include all or less than all of the batch normalization layers included in the model(s). The set B can include any number of layers (e.g., 1, 2, 20, etc.).

Specifically, a latent space $L^l$ is spanned by the activation statistics at the layer l of the model. In this space, single samples x are mapped via their instance statics at layer l, whereas the population statistics accumulated for each domain at the same layer l are used to represent domain centroids in such space. Intuitively, since activations in a neural network are highly domain-dependent, a cluster of points in this latent space coincides with a specific domain of which the accumulated population statistics provide a compact representation.

Thus, in some implementations, the latent embedding for a certain domain d can be defined as:

$$z_d = [z_d^1, z_d^2, \ldots, z_d^L] = [(\mu_d^1, \sigma_d^{1^2}), (\mu_d^2, \sigma_d^{2^2}), \ldots, (\mu_d^L, \sigma_d^{L^2})], \quad (4)$$

which is the vector of the accumulated population statics for the domain d for all layers $l \in B$.

Analogously, for an unseen target sample $x_t$, its projection can be derived by forward propagating it through the network and normalizing it by the instance statistics of its activations. The latent embedding $r_{x_t}$ for the target sample $x_t$ can thus be defined as the stacked vector of its instance statistics at different batch normalization layers in the network:

$$r_{x_t} = [r_{x_t}^1, r_{x_t}^2, \ldots, r_{x_t}^L] = [(\mu_{x_t}^1, \sigma_{x_t}^{1^2}), (\mu_{x_t}^1, \sigma_{x_t}^{2^2}), \ldots, (\mu_{x_t}^L, \sigma_{x_t}^{L^2})]. \quad (5)$$

Each of the tuples of the latent embedding $r_{x_t}$ represents the instance statistics collected at a certain layer l during forward propagation and can be used to map the sample $x_t$ in the latent space $L^l$ of layer l.

Once the embedding for the test sample is available, we can exploit such information to map the sample in the batch normalization latent spaces $L = \{L^l\}_{l \in B}$, where it is possible to determine the membership of a target sample $x_t$ to a domain d as, for example, the reciprocal of a distance measure between the target embedding and the domain embedding. This allows a soft domain classification of any test sample to each of the source domains.

To compute the distance measure between two points in the latent domain space $L^l$ of a layer l, consider the moving means and moving variances of the corresponding batch normalization layer as the parameters of a multivariate gaussian distribution. A distance on the space of probability measures can be adopted, i.e., a symmetric and positive definite function that satisfies the triangle inequality. One example distance function is the Wasserstein distance for the special case of two multivariate gaussian distributions.

Let $p \sim N(\mu_p, C_p)$ and $q \sim N(\mu_q, C_q)$ be two normal distributions on $R^n$, with expected value $\mu_p$ and $\mu_q \in R^n$ respectively and $C_p, C_q \in R^{n \times n}$ covariance matrices. The 2-Wasserstein distance is then:

$$W(p, q) = \phi((\mu_p, C_p), (\mu_q, C_q)) \quad (6)$$

$$= \|\mu_p - \mu_q\|_2^2 + \text{trace}\left(C_p + C_q - 2\left(C_2^{\frac{1}{2}} C_1 C_2^{\frac{1}{2}}\right)^{\frac{1}{2}}\right) \quad (7)$$

where $\|\cdot\|_2$ is the Euclidean norm on $R^n$.

Example implementations leverage the Wasserstein metrics to measure the distance between a test sample $x_t$ and the embedding $z_d$ of the domain d by summing over the batch normalization layers $l \in B$ the distance between the activation embeddings $r_{x_t}^l$ and $z_d^l$.

$$D_L(z_d, r_{x_t}) = \sum_{b \in B} W(z_d^l, r_{x_t}^l) \quad (8)$$

$$= \sum_{l \in B} \phi((\mu_d^l, \text{Diag}(\sigma_d^{l\,2})), (\mu_{x_t}^l, \text{Diag}(\mu_{x_t}^{l\,2}))) \quad (9)$$

where B is the set of the batch normalization layers in the selected network architecture.

The membership of a test sample $x_t$ to the domain d can in some implementations be defined as the reciprocal of the distance from that domain:

$$w_d^{x_t} = \frac{1}{D_L(z_d, r_{x_t})} \quad (10)$$

By looking at Equation 2 and 3, it can be seen that the only difference between the instance and the batch statistics is the number of samples over which they are estimated, and it is hence fair to compare them by computing the Wasserstein distance between the two multivariate gaussian distributions represented by them.

Once the memberships to all source domains are computed, they can be used to finally recover the target distribution $p_t^{xy}$ as a mixture (e.g., a linear combination) of the learned source distributions $p_d^{xy}$ weighted by the corresponding domain membership:

$$p_t^{xy} = \frac{\sum_{d \in D} w_d^{x_t} p_d^{xy}}{\sum_{d \in D} w_d^{x_t}} \quad (11)$$

where $w_d^{x_t}$ is the membership value of the test sample $x_t$ to the domain d.

The final prediction $f(x_t)$ can analogously be computed as, for example, a linear combination of the multiple predictions obtained under different domain assumptions:

$$f(x_t) = \frac{\sum_{d \in D} w_d^{x_t} f(x_t|d)}{\sum_{d \in D} w_d^{x_t}}, \quad (12)$$

where $f(x_t|d)$ is the prediction obtained for the sample $x_t$ using the model learned from the domain d. In some implementations, the computation of the final prediction can occur at the softmax layer of the ensemble model. In other implementations, the computation of the final prediction can occur at the output layer of the ensemble model. In other implementations, the computation of the final prediction can individually occur at each layer of the ensemble model and the final prediction can be passed at each layer to the next sequential layer.

Figure 3A:
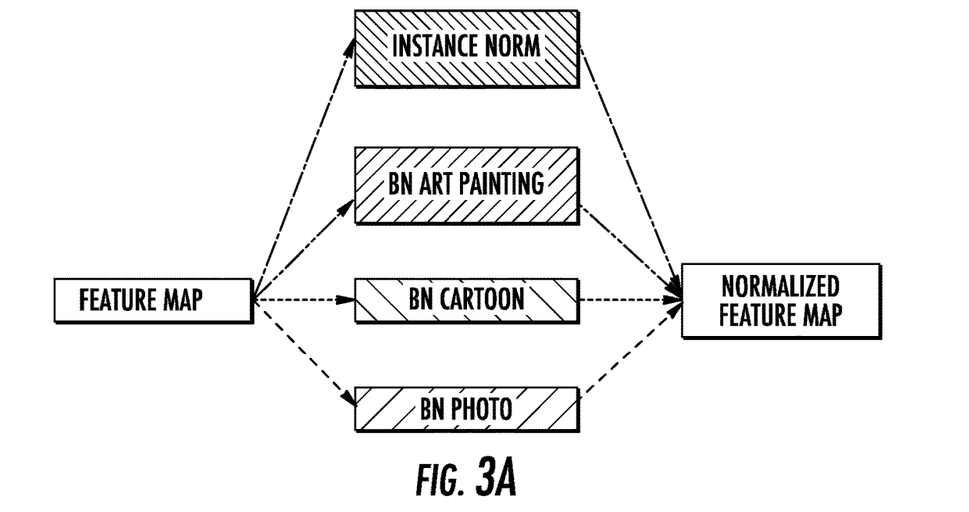
FIGS. 3A and 3B depict application of the proposed approach to an example dataset for experimentation according to example embodiments of the present disclosure.
Figure 3B:
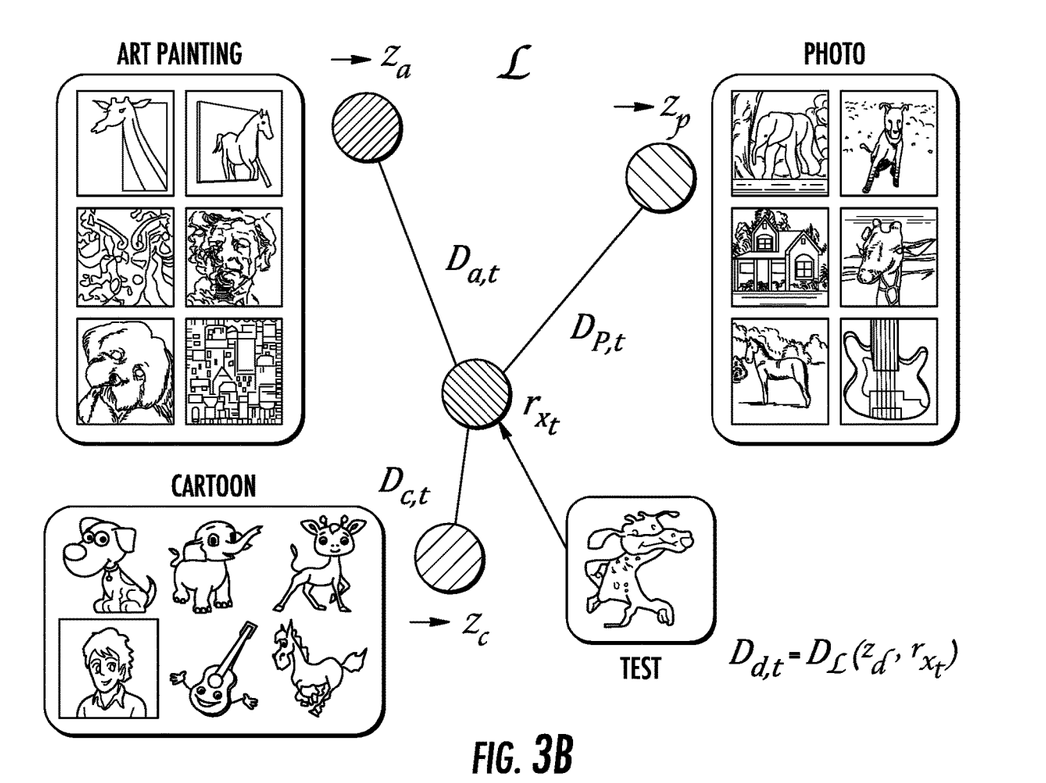
Figure 4:
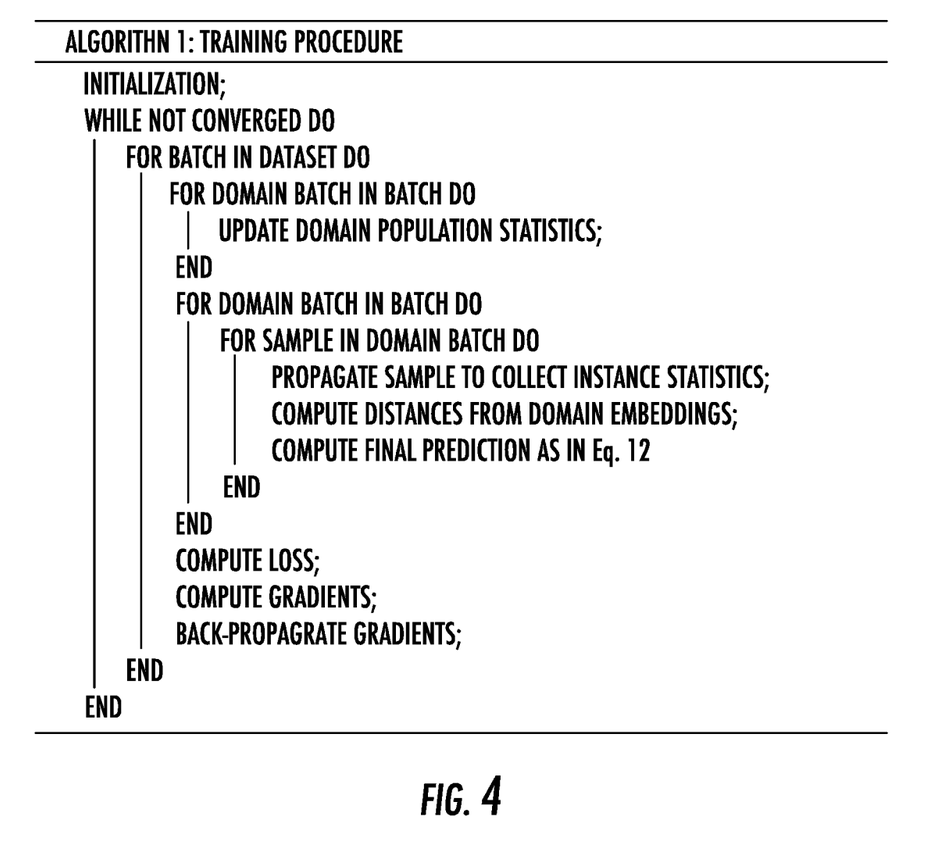
FIG. 4 provides pseudocode for an example training algorithm according to example embodiments of the present disclosure.

As one example for illustration, FIGS. 3A and 3B illustrates the application of this procedure to the PACS dataset as an example. This dataset is composed of 4 domains, 3 of which are assumed available at training time in the illustrated example. Consequently, every training batch is composed of 3 domain batches, one for each of the source domains. FIG. 3A depicts the multi-source domain alignment layer introduced above. During training, different statistics are updated and applied for each of the source domains. At inference time, the target sample is propagated with instance normalization to derive its latent embedding. As shown in FIG. 3B, the so-collected population and instance statistics are used to map the domains and the target sample to the same latent space. Finally, the domain membership of a sample can be estimated computing the Wasserstein distance between the domain and target centroids.

This elegant formulation allows optimal navigation in the latent space of the batchnorm statistics. Specifically, if a test sample belongs to one of the source domains, the proposed methods assigns a high membership value to the corresponding domain. On the other hand, if the test sample does not belong to any of the source domains, the corresponding target model will be expressed as a combination (e.g., linear combination) of the source models cleverly embodied in the lightweight ensemble.

Example Training Policy

To better define the latent space of every batch normalization layer, example implementations replicate the same procedure described in the previous sections to also compute predictions at training time for samples from known domains. In one illustrative example, a training batch is composed of K domain batches with an equal number of samples. During every training step, (i) the domain batches are first propagated to update the corresponding domain population statistics ($\mu_d, \sigma_d^2$,). Then, (ii) all the samples are forward propagated without assuming hard domain membership to collect their instance statistics, analogously to how explained for a target sample at inference time. Finally, (iii) each sample is propagated under K multiple domain assumptions and the resulting domain-specific predictions are weighted according to Eq. 12. Applying this procedure during training encourages the creation of a well-defined batch normalization latent space.

In some implementations, since the model is initialized with certain weights (e.g., pre-trained on ImageNet), each domain-specific batch normalization branch needs to be specialized before starting this training procedure, otherwise convergence problems might occur. Therefore, in some implementations, domain-specific batch normalization statistics can be pre-computed with a warm-up epoch where the model is trained on the whole dataset following the standard training procedure, except that domain batches are propagated through the corresponding batch normalization branch (e.g., to accumulate domain-specific batch normalization statistics).

Example Devices and Systems

Figure 5A:
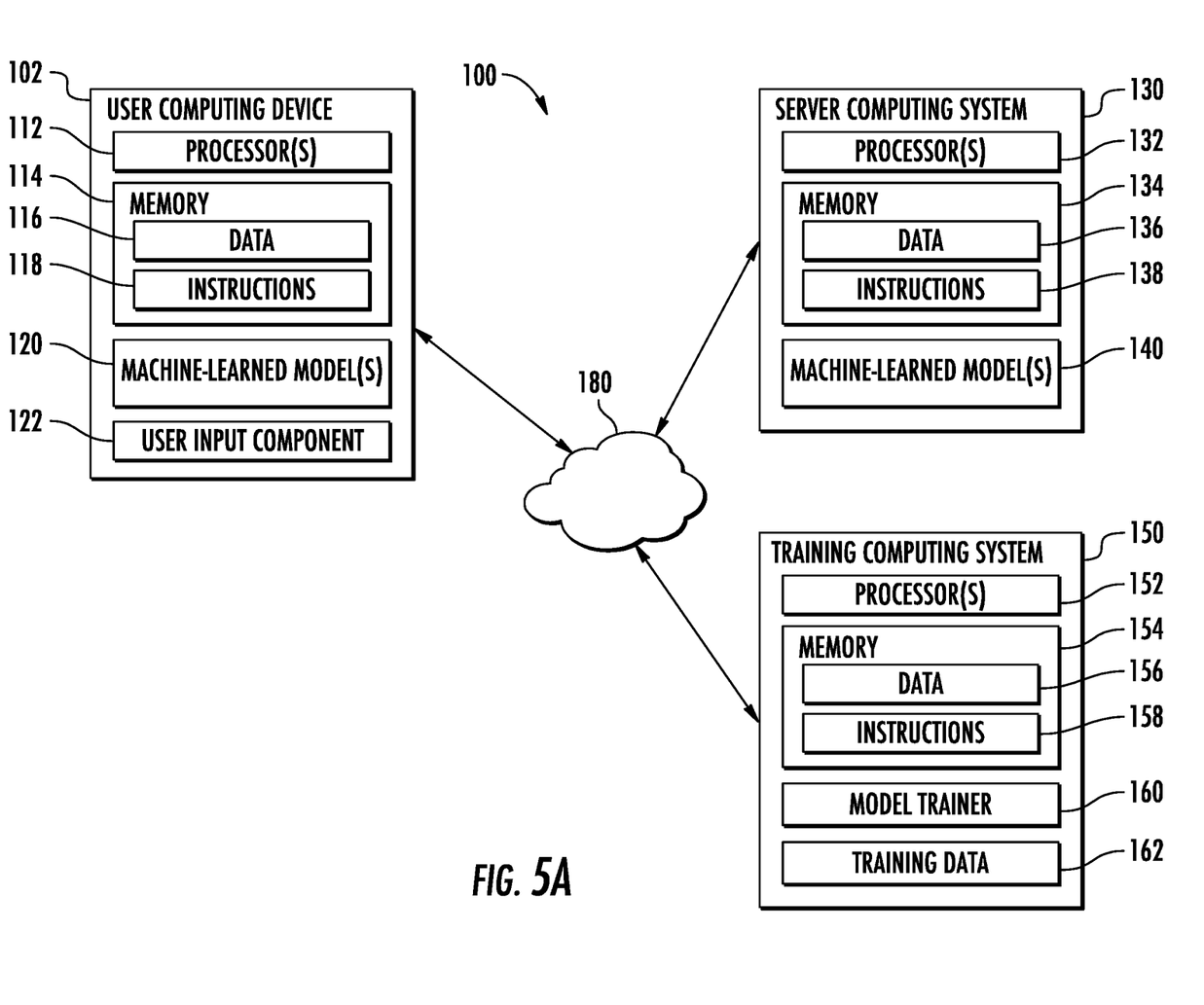
FIG. 5A depicts a block diagram of an example computing system according to example embodiments of the present disclosure.

FIG. 5A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120.

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a domain generalization service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, data that is assigned to different source domains. Source domains can include different types of data, different sources of data, different structures of data, data associated with different entities, data associated with different conditions, etc.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 5A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 5B:
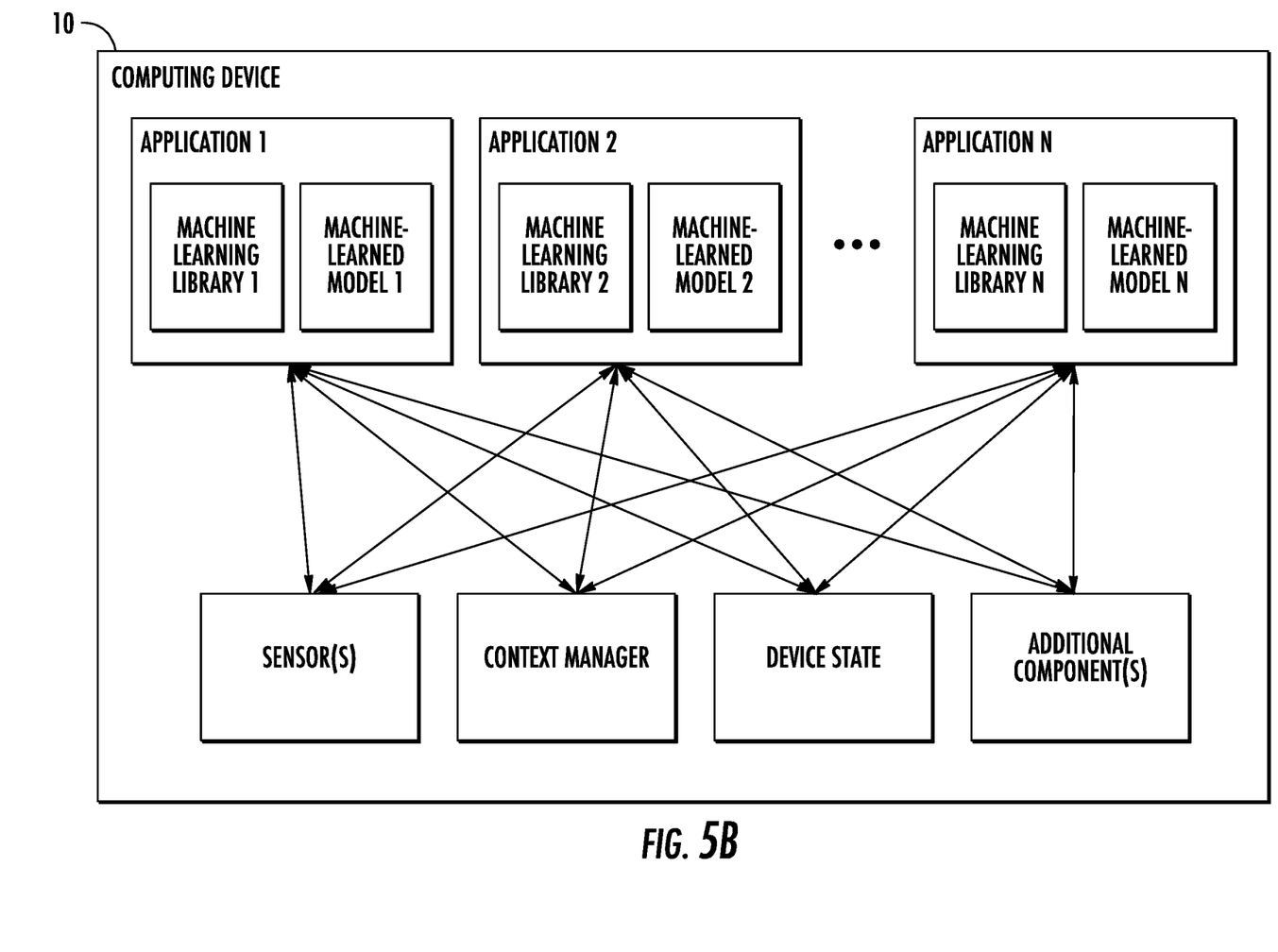
FIG. 5B depicts a block diagram of an example computing device according to example embodiments of the present disclosure.

FIG. 5B depicts a block diagram of an example computing device 10 according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 5B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 5C:
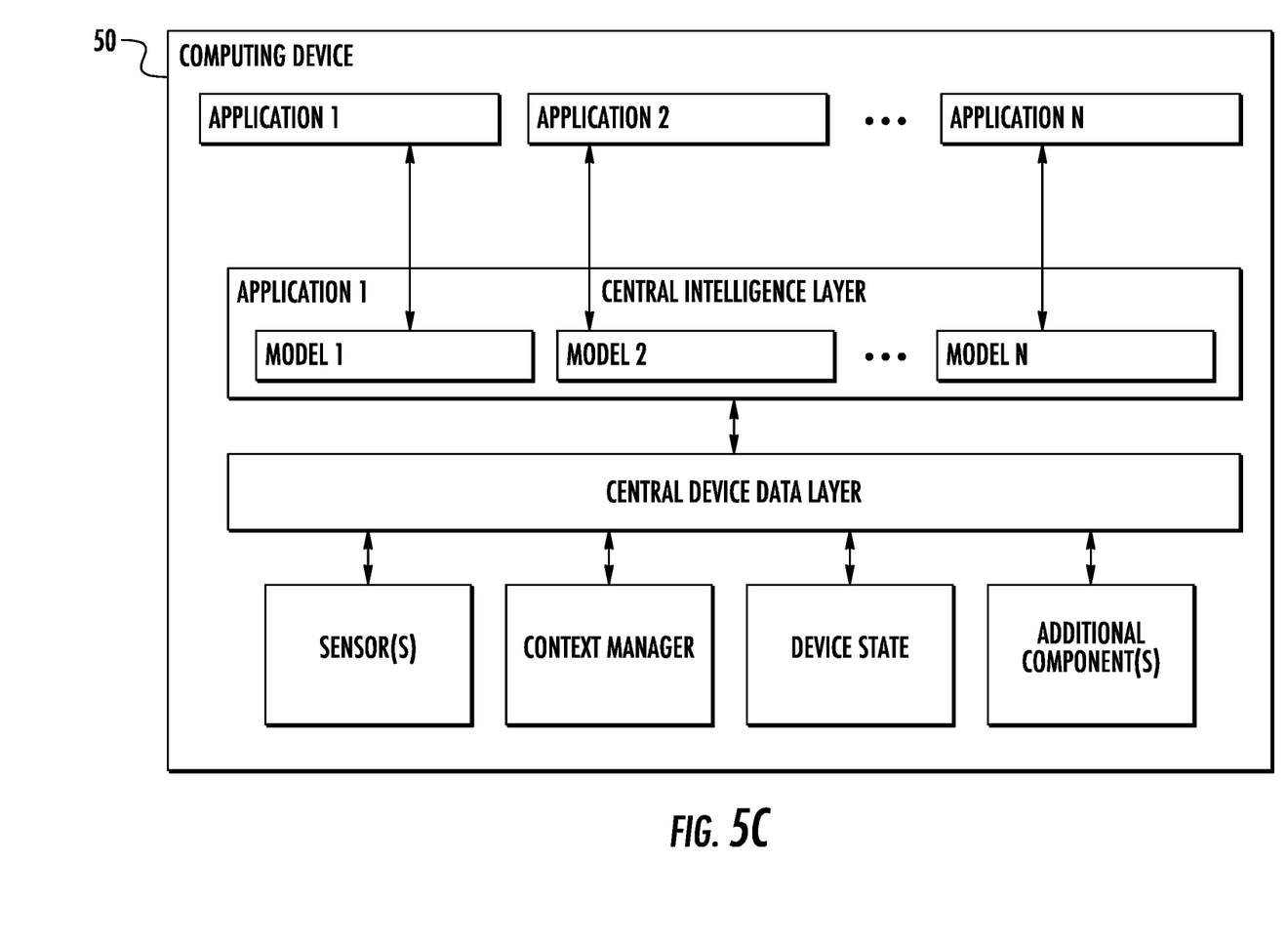
FIG. 5C depicts a block diagram of an example computing device according to example embodiments of the present disclosure.

FIG. 5C depicts a block diagram of an example computing device 50 according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 5C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 5C, the central device data layer can communicate with a number of other components of the computing device, such as, for example, one or more sensors, a context manager, a device state component, and/or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to perform domain generalization via batch normalization statistics, the method comprising:
   obtaining, by a computing system comprising one or more computing devices, a machine-learned ensemble model that comprises a shared parameter portion and a plurality of different batch normalization layers respectively associated with a plurality of different source domains, wherein a plurality of different sets of batch normalization statistics are respectively associated with the plurality of different source domains;
   accessing, a target sample associated with a target domain;
   determining, by the computing system, a target set of batch normalization statistics for the target sample;
   determining, by the computing system, a plurality of similarity scores respectively between the target set of batch normalization statistics and the plurality of different sets of batch normalization statistics respectively associated with the plurality of different source domains;
   respectively processing, by the computing system, the target sample with the machine-learned ensemble model to respectively generate a plurality of domain-specific predictions respectively associated with the plurality of different source domains;
   interpolating, by the computing system, the plurality of domain-specific predictions based at least in part on the respective similarity scores between the target set of batch normalization statistics and the plurality of different sets of batch normalization statistics to obtain a target prediction for the target sample in the target domain, wherein interpolating, by the computing system, the plurality of domain-specific predictions based at least in part on the respective similarity scores between the target set of batch normalization statistics and the plurality of different sets of batch normalization statistics to obtain the target prediction for the target sample in the target domain comprises:
      determining, by the computing system, a plurality of membership values respectively for the plurality of source domains, wherein the membership value for each source domain is inversely proportional to a respective distance between the target set of batch normalization statistics and the set of batch normalization statistics associated with such source domain; and
      determining, by the computing system, a weighted average of the plurality of domain-specific predictions weighted according to the plurality of membership values; and
   outputting, by the computing system, the target prediction for the target sample.

2. The computer-implemented method of claim 1, wherein the machine-learned ensemble model comprises one or more multi-source domain alignment layers, and wherein each multi-source domain alignment layer comprises a shared weight portion and two or more of the different batch normalization layers in parallel that are respectively associated with the plurality of source domains.

3. The computer-implemented method of claim 1, wherein the target sample was unavailable during training of the machine-learned ensemble model.

4. The computer-implemented method of claim 1, wherein the plurality of different sets of batch normalization statistics and the target set of batch normalization statistics each comprise respective values for a mean statistic and a variance statistic.

5. The computer-implemented method of claim 1, wherein the plurality of similarity scores respectively between the target set of batch normalization statistics and the plurality of different sets of batch normalization statistics respectively associated with the plurality of different source domains comprise a plurality of Wasserstein distances between respective multivariate gaussian distributions.

6. The computer-implemented method of claim 1, wherein the plurality of source domains comprise a plurality of image domains.

7. The computer-implemented method of claim 1, wherein the machine-learned ensemble model comprises a convolutional neural network.

8. The computer-implemented method of claim 1, wherein the machine-learned ensemble model comprises the shared parameter portion that is configured to perform feature extraction for all of the plurality of source domains and a plurality of different prediction heads that are respectively configured to separately perform prediction for the plurality of source domains.

9. The computer-implemented method of claim 1, wherein:
   respectively processing, by the computing system, the target sample with the machine-learned ensemble model to respectively generate the plurality of domain-specific predictions respectively associated with the plurality of different source domains comprises generating a plurality of softmax layer outputs respectively associated with the plurality of different source domains; and
   interpolating, by the computing system, the plurality of domain-specific predictions comprises:
      interpolating, by the computing system, the plurality of softmax layer outputs to generate an aggregate softmax output; and
   generating, by the computing system, the target prediction for the target sample based on the aggregate softmax output.

10. A computing system for training an ensemble model to perform domain generalization, the computing system comprising:
   one or more processors; and
   one or more non-transitory computer-readable media that collectively store:
      an ensemble model that comprises one or more multi-source domain alignment layers, wherein each multi-source domain alignment layer comprises a shared weight portion and a plurality of different batch normalization layers respectively associated with a plurality of source domains; and instructions that, when executed by the one or more processors, cause the computing system to perform operations, the operations comprising, for each of one or more training iterations:

obtaining a training batch that comprises a plurality of domain-specific sets of training examples respectively associated with the plurality of source domains;

updating a plurality of different sets of batch normalization statistics for the plurality of different batch normalization layers respectively associated with the plurality of source domains;

for each training example in the plurality of domain-specific sets of training examples:

determining a training set of batch normalization statistics for the training example;

determining a plurality of similarity scores respectively between the training set of batch normalization statistics and the plurality of different sets of batch normalization statistics respectively associated with the plurality of different source domains; and interpolating a plurality of domain-specific predictions based at least in part on the respective similarity scores between the training set of batch normalization statistics and the plurality of different sets of batch normalization statistics to obtain a training prediction for the training example, wherein interpolating the plurality of domain-specific predictions based at least in part on the respective similarity scores between the training set of batch normalization statistics and the plurality of different sets of batch normalization statistics to obtain the training prediction for the training example comprises:

determining a plurality of membership values respectively for the plurality of source domains, wherein the membership value for each source domain is inversely proportional to a respective distance between the training set of batch normalization statistics and the set of batch normalization statistics associated with such source domain; and determining a weighted average of the plurality of domain-specific predictions weighted according to the plurality of membership values;

determining an aggregate loss based on the respective training prediction generated for each training example in the plurality of domain-specific sets of training examples; and updating one or more parameter values for at least the shared weight portion of at least one of the one or more multi-source domain alignment layers.

11. The computing system of claim 10, wherein the operations further comprise, prior to the one or more training iterations:

performing a warm-up epoch in which the ensemble model is trained on an entire training dataset with gradients from domain-specific batches being propagated through a corresponding one of the different batch normalization layers that is associated with the corresponding source domain.

12. The computing system of claim 10, wherein the plurality of different sets of batch normalization statistics and the training set of batch normalization statistics each comprise respective values for a mean statistic and a variance statistic.

13. The computing system of claim 10, wherein the plurality of similarity scores respectively between the training set of batch normalization statistics and the plurality of different sets of batch normalization statistics respectively associated with the plurality of different source domains comprise a plurality of Wasserstein distances between respective multivariate gaussian distributions.

14. The computing system of claim 10, wherein the operations further comprise, after the one or more training iterations:

deploying the ensemble model for performing domain generalization to generate a target prediction for a target sample associated with an unseen target domain.

* * * * *